C. RUBBLES.
Corn Planter and Cultivator.
No. 77,535. Patented May 5, 1868.
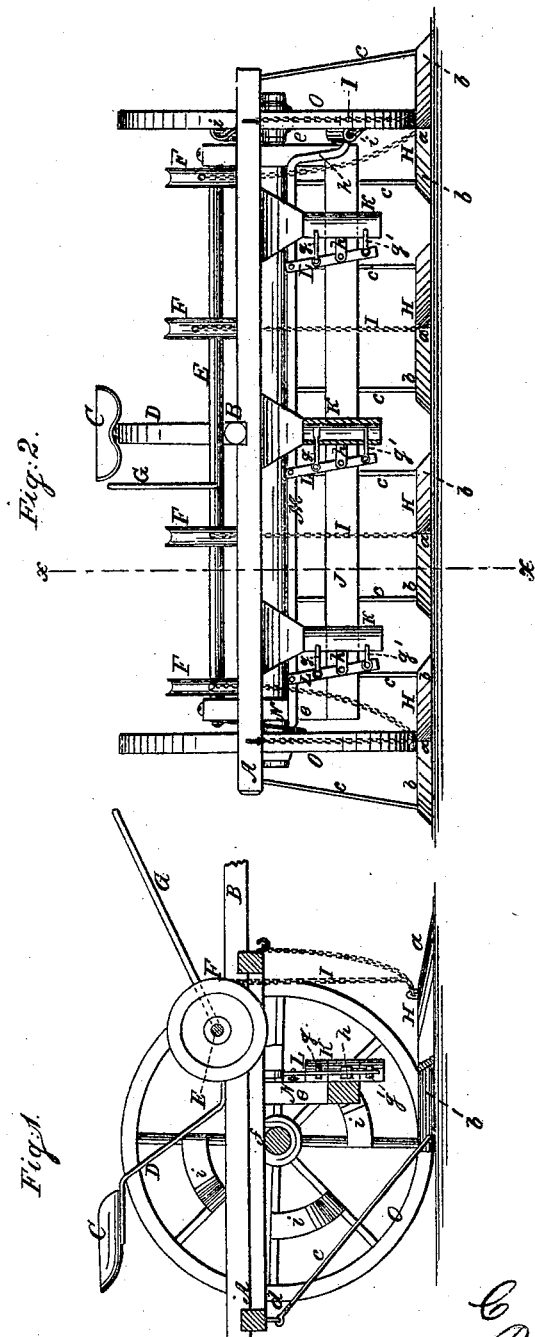

United States Patent Office.

CASPER RUBBLES, OF LOWVILLE, NEW YORK.

Letters Patent No. 77,535, dated May 5, 1868.

IMPROVEMENT IN PLANTER AND CULTIVATOR.

The Schedule referred to in these Letters Patent and making part of the same.

TO ALL WHOM IT MAY CONCERN:

Be it known that I, CASPER RUBBLES, of Lowville, in the county of Lewis, and State of New York, have invented a new and improved Seed-Planter and Cultivator; and I do hereby declare that the following is a full, clear, and exact description thereof, which will enable others skilled in the art to make and use the same, reference being had to the accompanying drawings, and to the letters of reference marked thereon.

This invention relates to a new and improved combination of a seed-planter and cultivator, whereby the machine may be used either as a seed-planter or cultivator, and made to work in either capacity equally as well as if made separately for each.

In the accompanying sheet of drawings—

Figure 1 is a transverse vertical section of my invention, taken in the line $x\,x$, fig. 2.

Figure 2, a front view of the same.

Similar letters of reference indicate like parts.

A represents the frame of the machine, which is of rectangular form, and has a draught-pole, B, permanently attached to it.

C is the driver's seat, secured on the upper end of an elastic bar, D, which is attached to the draught-pole, and E is a shaft, placed on the front part of the frame A, and having a series of wheels or pulleys, F, keyed upon it, at equal distances apart. This shaft E has a handle, G, attached, for the convenience of turning it.

H represents a series of shares, four being shown. These shares may be termed skeleton ones, being formed of a small V-shaped point, $a$, having two diverging mould-boards, $b\,b$, of quite narrow or shallow depth, so that they will run or work under the surface of the ground rather than over it.

The rear ends of the mould-boards $b\,b$ are attached to rods or bars $c\,c$, the upper ends of the latter being connected by joints $d$ to the rear bar of the frame A. To the front end of each share there is attached a chain, I, and these chains are connected to the wheels or pulleys F on shaft E.

It will be seen from the above description that the shares H may be raised or lowered by turning the shaft E, raised entirely out of the ground when not required for use, and lowered so as to work into the earth at a greater or less depth, as occasion may require.

J represents a bar, which is parallel with the front and rear bars of the frame A, and has its ends attached to pendants $e\,e$, which are secured, one to each side-piece $f$ of the frame A. This bar J is considerably below the frame A, and it has three vertical tubes, K, secured to it at equal distances apart, each tube having a seed-hopper placed on it, as shown in red in fig. 2. In each tube K two horizontal slides, $g\,g'$, work, one above the other.

These slides are connected to levers L, which are pivoted in arms $h$, attached horizontally to the tubes K, the slides $g$ being above, and the slides $g'$ below the pivots of the levers L. The upper ends of these levers are connected to a rod, M, which extends the whole length of the bar J, and has a spring, N, bearing against one end of it, the opposite end of said rod being bent down in crank-form, as shown at $h$, so that projections $i$, at the inner side of one of the wheels O, on which the machine is mounted, may act against the rod as the machine is drawn along. These projections $i$, in connection with the spring N, give a reciprocating movement to rod M, and operate the slides $g\,g'$, the seed, as the upper slides $g$ are drawn outward from the tubes K, dropping down upon the lower slides, which are in the tubes. As the upper slides $g$ are forced within the tubes, the lower slides $g'$ are drawn out from it, and the seed discharged between the shares H, which throw sufficient earth at each side to cover it.

This machine may be used either as a cultivator or seed-planting machine without any manipulation or change of parts whatever.

Having thus described my invention, I claim as new, and desire to secure by Letters Patent—

1. The V-shaped shares H, applied to the machine through the medium of the rods or bars $c\,c$, which are connected by joints $d$ to the rear bar of the frame A, and connected at their front ends by chains I to wheels or pulleys F on shaft E, substantially as shown and described.

2. The tubes K, provided with the slides $g\,g'$, attached to the levers L, which are connected to the reciprocating rod M, operated through the medium of the spring N, and the projections $i$ on wheel O, substantially as set forth.

CASPER RUBBLES.

Witnesses:
Z. KNOX,
J. B. VISSCHER.